(12) United States Patent
Fletcher et al.

(10) Patent No.: US 8,610,659 B2
(45) Date of Patent: Dec. 17, 2013

(54) METHOD AND APPARATUS FOR AUTOMATIC BRIGHTNESS ADJUSTMENT ON A DISPLAY OF A MOBILE ELECTRONIC DEVICE

(75) Inventors: Bergen Fletcher, Kitchener (CA); Conrad Aleksander Kreek, Waterloo (CA); Jeff Bos, Waterloo (CA)

(73) Assignee: BlackBerry Limited, Waterloo, ON ( * ) Notice: Subject to any disclaimer, the term of this patent is extended or adjusted under 35 U.S.C. 154(b) by 863 days.

(21) Appl. No.: 12/418,133

(22) Filed: Apr. 3, 2009

(65) Prior Publication Data

US 2009/0278828 A1 Nov. 12, 2009

Related U.S. Application Data

(60) Provisional application No. 61/052,541, filed on May 12, 2008.

(51) Int. Cl.
G09G 3/36 (2006.01)
(52) U.S. Cl.
USPC .......................................... 345/102; 345/207
(58) Field of Classification Search
USPC .................... 345/87–102, 207, 690
See application file for complete search history.

(56) References Cited

U.S. PATENT DOCUMENTS

| | | | |
|---|---|---|---|
| 5,617,112 A | 4/1997 | Yoshida et al. | |
| 6,507,286 B2 | 1/2003 | Weindorf et al. | |
| 6,798,395 B1 | 9/2004 | Yamauchi et al. | |
| 6,801,811 B2 | 10/2004 | Ranganathan et al. | |
| 6,816,141 B1 | 11/2004 | Fergason | |
| 6,891,525 B2 * | 5/2005 | Ogoro | 345/102 |
| 6,959,208 B2 | 10/2005 | Tanaka et al. | |
| 7,423,383 B2 * | 9/2008 | Kawano | 315/169.4 |
| 7,605,829 B2 * | 10/2009 | Oh | 345/690 |
| 2002/0050974 A1 | 5/2002 | Rai et al. | |
| 2002/0163524 A1 * | 11/2002 | Dutta | 345/589 |

(Continued)

FOREIGN PATENT DOCUMENTS

| | | |
|---|---|---|
| CA | 2537909 | 8/2006 |
| EP | 0861017 | 8/1998 |

(Continued)

OTHER PUBLICATIONS

"Palm m505 and m500 Handhelds Backlight Utility". Internet Citation (online) posted Jun. 14, 2001, http://www.palm.com/us/support/m505/backlight_utility.html [Retrieved on Aug. 19, 2008].

(Continued)

*Primary Examiner* — Rodney Amadiz
(74) *Attorney, Agent, or Firm* — Norton Rose Fulbright Canada LLP

(57) ABSTRACT

A system and method is provided for use in a mobile electronic device for adjusting brightness of a display on the mobile electronic device. The method comprises collecting a plurality of light sensor samples using an ambient light sensor of the mobile electronic device; calculating a representative value of the plurality of light sensor samples; comparing the representative value to at least one brightness threshold value; determining if a predetermined application is active on the mobile electronic device; determining whether to adjust the brightness of the display based on the comparison and based on whether predetermined application is active on the device; and adjusting the brightness of the display.

11 Claims, 12 Drawing Sheets

(56) References Cited

U.S. PATENT DOCUMENTS

| | | | |
|---|---|---|---|
| 2005/0051708 A1 | 3/2005 | Hotelling | |
| 2005/0102334 A1 | 5/2005 | Honda | |
| 2005/0190142 A1 | 9/2005 | Ferguson | |
| 2005/0225983 A1 | 10/2005 | Fornell | |
| 2007/0096935 A1* | 5/2007 | Lee et al. | 340/815.42 |
| 2007/0097065 A1* | 5/2007 | Kreek et al. | 345/102 |

FOREIGN PATENT DOCUMENTS

| | | |
|---|---|---|
| EP | 1303113 | 4/2003 |
| EP | 1505567 | 2/2005 |
| JP | 60031393 | 2/1985 |
| JP | 07294877 | 11/1995 |
| JP | 09230827 | 9/1997 |
| JP | 10084408 | 3/1998 |
| JP | 10096890 | 4/1998 |
| WO | WO9209163 | 5/1992 |
| WO | WO0041378 | 7/2000 |

OTHER PUBLICATIONS

MSDN,"Program Applications to Turn the Smartphone Backlight Off and On". Internet Citation (online) http://msdn.microsoft.com/en-us/library/aa455153(printer).aspx [Retrieved Aug. 19, 2008].

Bruce Ferguson, Portable Design Magazine, http://pd.pennnet.com/Articles/Article_Display.cfm?Section=Archives&Subsection=Display&ARTICLE_ID=196700&KEYWORD=microsemi, Jan. 2004.

Bordovsky, Michal—Canadian Intellectual Property Office, "Examiners Requisition" dated Mar. 20, 2012 for corresponding Canadian Patent Application No. 2,661,689, Canada.

* cited by examiner

METHOD AND APPARATUS FOR
AUTOMATIC BRIGHTNESS ADJUSTMENT
ON A DISPLAY OF A MOBILE ELECTRONIC
DEVICE

CROSS REFERENCE TO RELATED APPLICATIONS

The present application claims priority to U.S. provisional application No. 61/052,541, filed May 12, 2008, the entirety of which is hereby incorporated by reference.

FIELD

The present application relates generally to displays of electronic devices and more particularly to a method for automatically adjusting screen and/or keypad brightness of a mobile electronic device, based on factors such as the ambient lighting surrounding the device and if a particular application is active on the device.

BACKGROUND

Displays screen brightness, such as a liquid crystal displays, and keypad brightness on a mobile electronic device may be manually adjusted for different operating environments in order to provide an optimal user experience. For example, in outdoor or sunlight conditions the screen backlight should be bright enough in order to be readable and the keypad backlight should be off to conserve battery power. In normal indoor or office conditions, the screen backlight should operate at medium brightness while the keypad backlight is usually turned off. In dim or dark conditions, the screen backlight should be at low intensity so as to avoid eye strain and the keypad backlight should be on.

Ambient lighting conditions can change rapidly as the user moves between different working environments. For example, walking from indoors to outdoors may render the screen display screen immediately unreadable unless the screen backlight brightness is increased. Conversely, when the user moves from a bright environment into a dimly lit room, the keypad may be unreadable unless the keypad backlight is turned on. Furthermore, when a particular application is active on the device, it may be desirable to adjust the brightness of the screen and keypad backlights. Accordingly, there are challenges associated with managing screen and keypad backlighting as a user moves between different ambient lighting conditions and uses a particular application on the device, requiring the user to constantly readjust the brightness.

BRIEF DESCRIPTION OF THE DRAWINGS

The method for automatically adjusting screen and keypad brightness on a mobile electronic device will be better understood with reference to the following description and to the Figures, in which.

DETAILED DESCRIPTION

Figure 1:
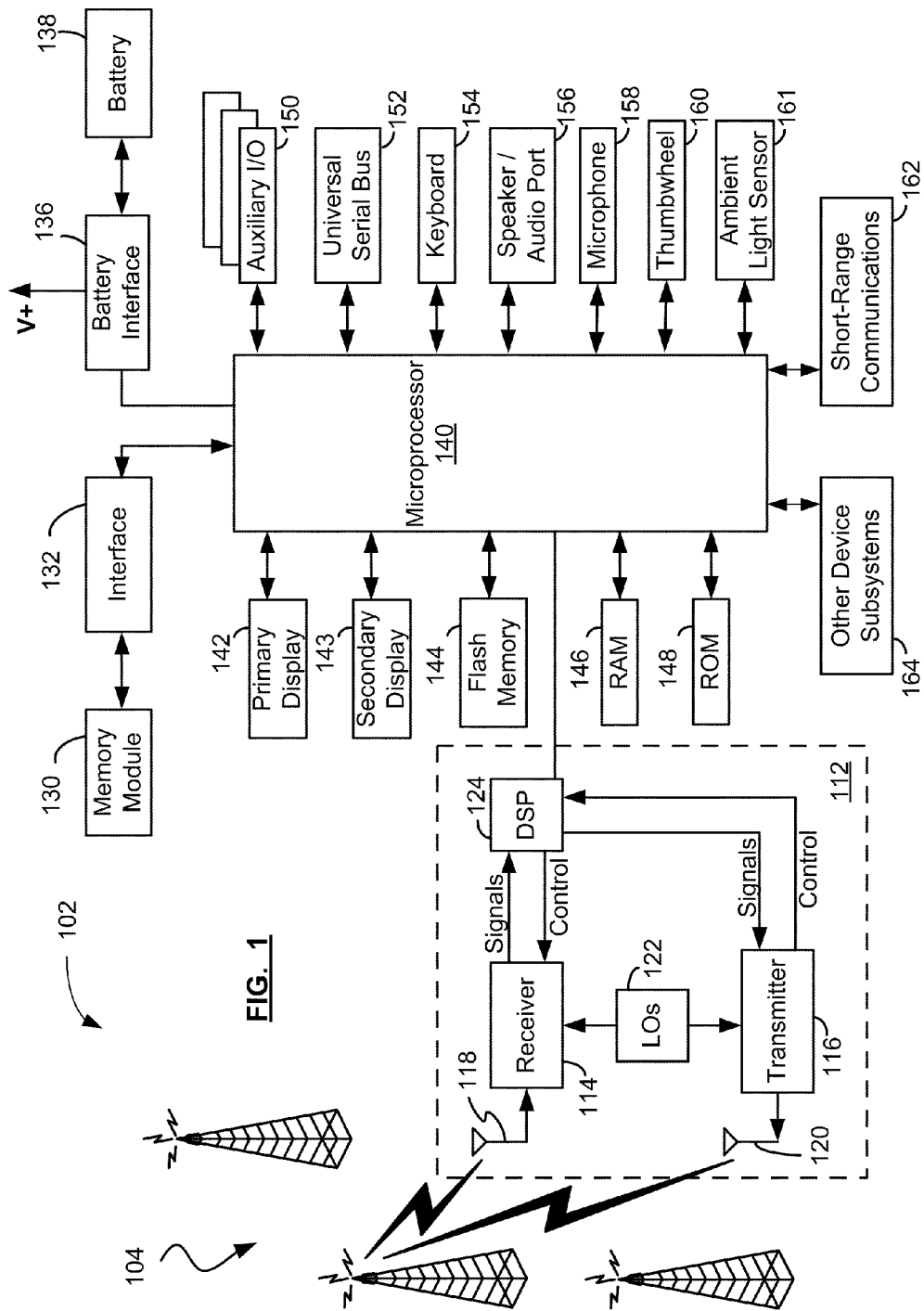
FIG. 1 shows in block diagram form a wireless device suitable for providing automatic adjustment of screen and keypad brightness in accordance with an embodiment.

One aspect of the present disclosure provides a method for use in a mobile electronic device for adjusting brightness of a display on the mobile electronic device. The method comprises collecting a plurality of light sensor samples using an ambient light sensor of the mobile electronic device; calculating a representative value of the plurality of light sensor samples; comparing the representative value to at least one brightness threshold value; determining if a predetermined application is active on the mobile electronic device; determining whether to adjust the brightness of the display based on the comparison and based on whether predetermined application is active on the device; and adjusting the brightness of the display.

Another aspect of the present disclosure provides a wireless device comprising a processor for controlling operation of the wireless device, an ambient light sensor providing a signal to the processor indicating an ambient light intensity surrounding the wireless device, a keypad device coupled to the processor for accepting an input, at least one display device coupled to the processor for communicating an output to the user, a communications subsystem coupled to the processor for communicating with a communications network, a memory coupled to the processor, and a storage device coupled to the processor. The wireless device includes a brightness adjustment module resident in the memory for execution by the processor. The brightness adjustment module may be configured to collect a plurality of light sensor samples using the ambient light sensor; calculate a representative value of the plurality of light sensor samples; compare the representative value to at least one brightness threshold value; determine if a predetermined application is active;

determine whether to adjust the brightness of at least one of the display device and the keypad device based on the comparison and based on whether the predetermined application is active; and adjust the brightness of the display.

Another aspect of the present disclosure provides a method for automatically adjusting at least one of display screen brightness and keypad brightness on a wireless device having a processor connected to an ambient light sensor, display screen, and keypad. The method comprises collecting a plurality of light sensor samples using the ambient light sensor; calculating a representative value of the plurality of light sensor samples; comparing the representative value to a plurality of brightness threshold values; determining whether to adjust at least one of the display screen brightness and the keypad brightness based on the comparison; and adjusting at least one of the display screen brightness and the keypad brightness. The brightness threshold values include an upper limit for a VERY DIM mode where the display screen brightness is set for a very low lighting environment; a lower limit and an upper limit for a DIM mode where the display screen brightness is set for a low lighting environment and the display screen brightness is set to a brightness that is higher than the VERY DIM mode; a lower limit and an upper limit for an OFFICE mode where the display screen brightness is set to a brightness that is higher than the DIM mode; and a lower limit for a BRIGHT mode where the display screen brightness is set to full brightness.

Reference is first made to FIG. 1, which shows a block diagram illustrating a wireless device 102 suitable for implementing a system and method for automatically adjusting screen and keypad brightness in accordance with an embodiment of the present disclosure.

The wireless device 102 communicates through a wireless communication network 104. The wireless network 104 includes antennae, base stations, and supporting radio equipment as for supporting wireless communications between the wireless device 102 and other devices connected to wireless network 104. The wireless network 104 may be coupled to a wireless network gateway and to a wide area network, shown in FIG. 2.

In an embodiment, the wireless device 102 is a two-way mobile communication device having at least voice and data communication capabilities, including the capability to communicate with other computer systems. In an embodiment, the wireless device 102 is a clamshell handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), a clamshell device, or a flip-phone. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In an embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a primary display 142, an optional secondary display 143, a flash memory 144, a random access memory (RAM) 146, a read-only memory (ROM) 148, auxiliary input/output (I/O) subsystems 150, a data port such as Universal Serial Bus (USB) port 152, a keyboard or keypad 154, a speaker or audio port 156 for connecting to, for example a set of headphones or an earpiece, a microphone 158, a clickable thumbwheel or thumbwheel 160, an ambient light sensor 161, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the primary display 142, the secondary display 143, and the clickable thumbwheel 160, for example, may be used for both communication-related functions, such as displaying notifications or entering a text message for transmission over the wireless network 104, and executing device-resident functions such as a clock, a calculator or a task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. In an embodiment, PIM and/or media data items are seamlessly combined, synchronized, and updated via the wireless network 104, with the wireless device user's corresponding data items stored and/or associated with a host computer system thereby creating a mirrored or partially mirrored host computer on the wireless device 102 with respect to such items. This may be advantageous where the host computer system is the wireless device user's office computer system. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the primary display 142, secondary display 143, or alternatively to the auxiliary I/O device 150. A user of the wireless device 102 may also compose data items, such as email messages, for example, using the keypad 154 and/or the clickable thumbwheel 160 in conjunction with the primary display 142 and possibly the auxiliary I/O device 150. The keypad 154 maybe either a complete alphanumeric keypad or telephone-type keypad. These composed items may be transmitted through the communication subsystem 112 over the wireless network 104 or via the short range communication subsystem 162.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the primary display 142 or the secondary display 143 may also be used to provide an indication of the identity of a calling party, duration of a voice call, or other voice call related information. Stereo headphones or an earpiece may also be used in place of the speaker 156.

The USB port 152 is normally implemented in a personal digital assistant (PDA) type communication device for which synchronization with a user's computer is a desirable, albeit optional, component. The USB port 152 enables a user to set preferences through an external device or software application and extends the capabilities of the wireless device 102 by providing for information or software downloads to the wireless device 102 other than through the wireless network 104. The alternate download path may, for example, be used to load software or data files onto the wireless device 102 through a direct, reliable and trusted connection.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as one or more of 802.11b, 802.11g, and/or 802.11n.

Figure 2:
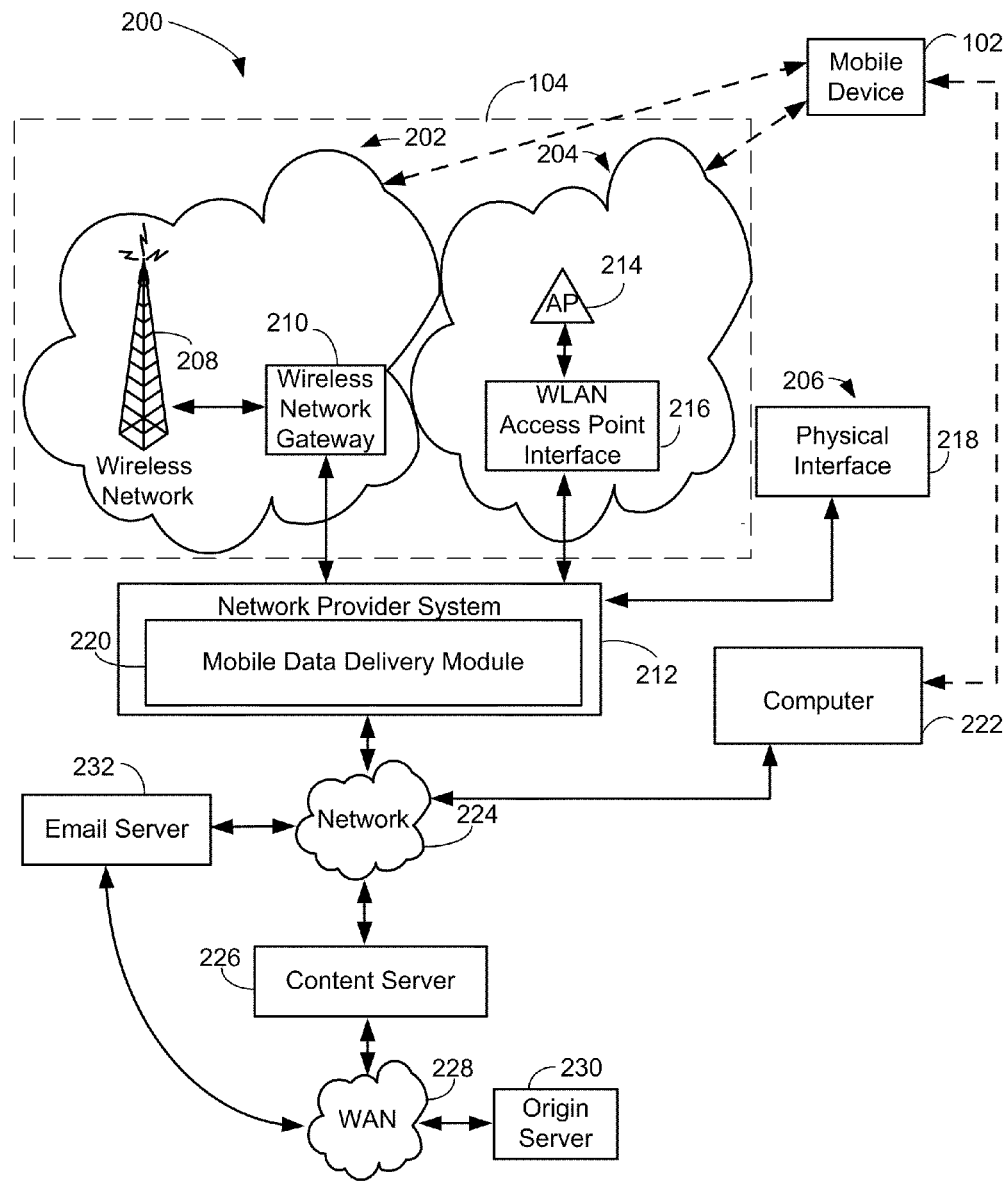
FIG. 2 shows in block diagram form a communication system suitable for providing the operating environment of the wireless device of FIG. 1 in accordance with an embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), 3G/4G networks, or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as one or more of 802.11b, 802.11g, or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to an embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In an embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 can be temporarily and directly connected to the computer 222 using, for example, the USB port 152. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to an embodiment, the mobile data delivery module 220 provides connectivity between the wireless WAN 202 and the WLAN 204 and the other connection 206 and devices and/or networks connected directly or indirectly to the network provider system 212. In an embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
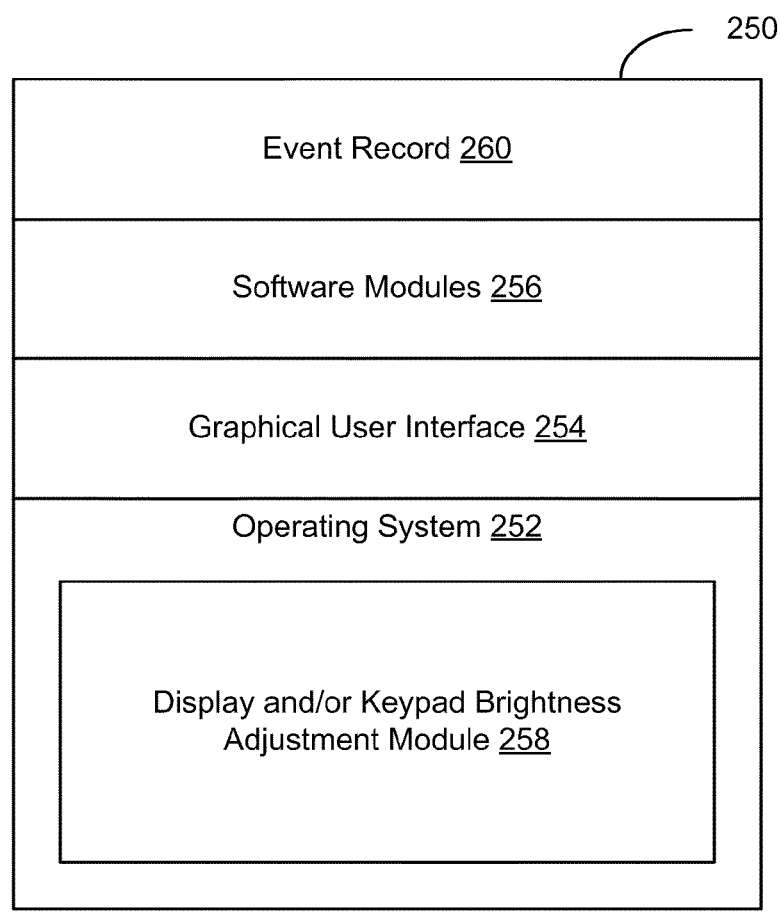
FIG. 3 shows in block diagram form the contents of a memory of the wireless device of FIG. 1.

Reference is next made to FIG. 3, which shows a block diagram illustrating a memory 250 of the wireless device 102. The memory 250 has various software components for controlling the wireless device 102 and may include, for example, the flash memory 144, the RAM 146, the ROM 148, the memory module 130 and/or the other device subsystems 164. In accordance with an embodiment, the wireless device 102 is intended to be a multi-tasking clamshell mobile communication device for sending and receiving data items, such as instant messages, for making and receiving voice calls, and for creating calendar events and alerts. To provide a user-friendly environment to control the operation of the wireless device 102, an operating system (OS) 252 resident on the wireless device 102 provides a basic set of operations for supporting various applications typically operable through a graphical user interface (GUI) 254, which may include a secondary GUI for display on the optional secondary display 143.

The OS 252 may include a display and/or keypad brightness adjustment module 258 for generating and/or handling events related to, for example, a received ambient light signal generated by and received from the ambient light sensor 161. The ambient light sensor 161 may, in one example, be positioned on a housing of the wireless device 102 and may supply a signal to an input of the microprocessor 140. The display and/or keypad brightness adjustment module 258 manages the detection of the signal supplied by the ambient light sensor 161 and performs appropriate functions in response to these signals, which is described in more detail below in connection with FIGS. 5-12. Additionally, the display and/or keypad brightness adjustment module 258 may provide information related to the ambient light detected by the sensor 161 to other software modules, such as the software modules 256, which may execute functions or actions in response to these events.

The operating system 252 provides basic input/output system features to obtain input from the auxiliary I/O 150, the keypad 154, the clickable thumbwheel 160, the ambient light sensor 161, and other input devices, and to facilitate output to the user via at least one of the primary display 142 and the secondary display 143. The GUI 254 is typically a component of the operating system 252. One or more software modules 256 for managing communications or providing a personal digital assistant (PDA) or other functions may also be included. The memory 250 also includes an email and calendar client, which may be combined in, for example, a PIM application having email-based calendaring and scheduling functions. Typically, the PIM is installed as one of the software modules 256. Alternatively, the display and/or keypad brightness adjustment module 258 may be included among the software modules 256. The memory 250 may also include an event record 260 for storing information relating to events or data relating to sensor inputs, such as the ambient light sensor 161. Thus, the wireless device 102 includes computer executable programmed instructions for directing the wireless device 102 to implement various applications. The programmed instructions may be embodied in the one or more software modules 256 resident in the memory 250 of the wireless device 102.

Alternatively, the programmed instructions may be tangibly embodied on a computer readable medium (such as a DVD, CD, floppy disk or other storage media) which may be used for transporting the programmed instructions to the memory 250 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
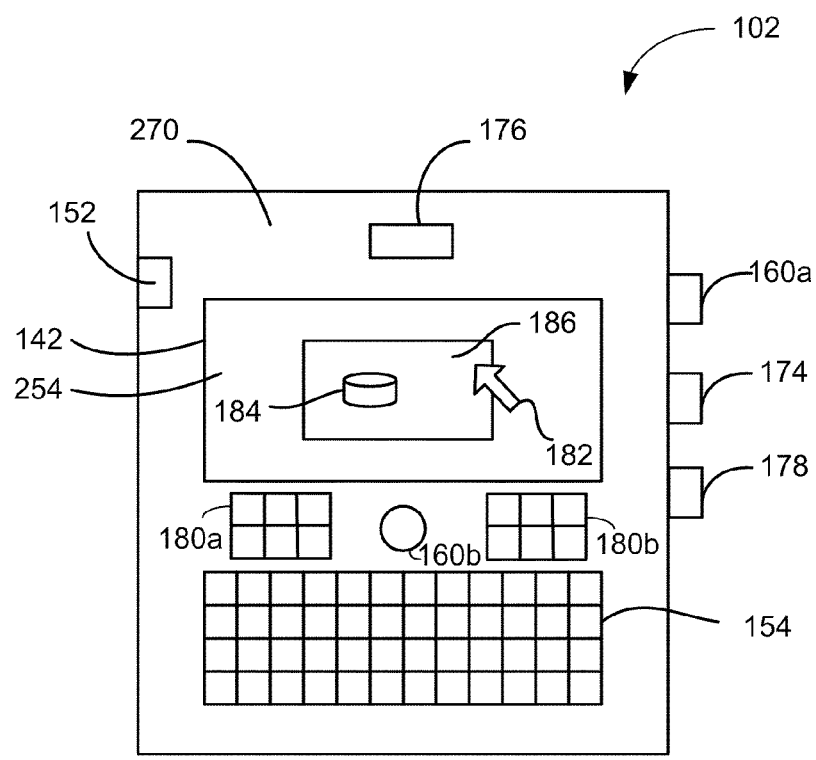
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 270, the data or serial port 152, the display screen 142, the graphical user interface (GUI) 254, the keypad 154, the clickable thumbwheel or scroll buttons 160a or other device for navigation such as a trackball 160b, one or more input buttons 174 (e.g., select, cancel, talk, play, stop, fast forward, rewind, next, previous buttons), signal inputs/outputs 176 (e.g., direct wire connection or inductive coupling power connector input, microphone, speaker, data interface input, etc.), and an audio port 178. Additionally, the wireless device 102 may have a number of navigation control buttons represented by numerals 180a and 180b. The navigation control buttons 180 may provide a number of functions such as a send and/or end key for a mobile telephone application of the wireless device 102, a menu key, an escape key, etc. The functions of the navigation control buttons 180 may be user configurable. Internally, the wireless device 102 includes one or more circuit boards (not shown), the microprocessor 140 (FIG. 1), the memory 250 (FIG. 3), the battery 138 (FIG. 1), the antennae 118, 120 (FIG. 1), etc., which may all be coupled to the signal inputs/outputs 176, the keypad 154, the display screen 142, the clickable thumbwheel 160, etc.

The microprocessor 140 is typically coupled to one or more input devices (e.g., the buttons 404, the keypad 154, the clickable thumbwheel 160) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 250.

A user may interact with the wireless device 102 and its software modules 256 using the GUI 254. The GUI 254 is controlled by the operating system 252 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel 160 and/or the keypad 154. Generally, the GUI 254 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 182 over an object 184 (i.e., "pointing" at the object) and by "clicking" on the object 184 (e.g., by depressing the thumbwheel 160 or a button on the keyboard 154, etc.). This is often referred to as a point-and-click or selection operation. Typically, the object 184 may be highlighted (e.g., shaded) when it is selected or pointed at by the pointer or cursor 182 to indicate that the object 184 is selectable.

Typically, a GUI-based system presents application, status, and other information to the user in windows appearing on the display 142. A window 186 is a display area shown within the display 142, typically rectangular, in which a user may view an application or document. The window 186 may be open, closed, displayed full screen, reduced to an icon, increased or reduced in size, or moved to different areas of the display 142. Multiple windows 186 may be displayed simultaneously. For example, the windows 186 may be displayed within other windows, overlapped with other windows, or tiled within the display area.

Disclosed herein are example methods for automatically adjusting screen and/or keypad brightness on an electronic device, such as automatically adjusting the backlight (or other lighting mechanism) of the screen and keypad of the mobile electronic device 102 illustrated in FIG. 1. The method may be implemented by an application (e.g., the display and/or keypad brightness adjustment module 258) executable by a processor of a mobile device (such as processor 140 of FIG. 1) to correctly switch between multiple screen-specific ambient lighting modes (referred to herein as VERY DIM, DIM, OFFICE and BRIGHT, respectively) and multiple keypad-specific ambient lighting modes (referred to herein as KEYPAD ON-DIM, KEYPAD ON-NORMAL and KEYPAD OFF, respectively). In one example, the screen-specific modes and keypad-specific modes may be determined independently of each other. In VERY DIM mode, the screen backlight may be dimmed for very low lighting environment, for example inside a dark movie theatre or a dark room. In DIM mode, the screen backlight may be dimmed for low lighting environment. In OFFICE mode, the screen backlight may be set to a brightness suitable for an office environment (e.g., in between DIM and BRIGHT mode). In BRIGHT mode, the screen backlight may be set at full brightness, suitable for legibility in bright sunlight (as indicated below, KEYPAD OFF mode may be enabled whenever BRIGHT mode is enabled). In KEYPAD ON-NORMAL mode, the keypad backlight may be turned on. In KEYPAD ON-DIM mode, the keypad backlight may be dimmed (e.g., set at a lesser brightness than the brightness used for KEYPAD ON-NORMAL mode). In KEYPAD OFF mode, the keypad backlight may be turned off. The various screen-specific and keyboard-specific modes are determined in response to detected ambient light conditions (e.g., by detected ambient light sensor 161) and operate to set the backlights to appropriate operating states, as discussed in greater detail below.

Each ambient lighting mode may have a corresponding brightness/state value or range and example values or ranges are set forth in Table A., "% PWM" represents the duty cycle of a pulse width modulated signal of variable base frequency dependent on the specified duty cycle, "Lux range" represents the range of ambient lighting intensity (measured in Lux units, where Lux represents the amount of visible light per square meter incident on a surface) in which each mode operates:

TABLE A

| | VERY DIM mode | DIM mode | OFFICE mode | BRIGHT mode |
|---|---|---|---|---|
| Screen brightness mode | | | | |
| Lux range of ambient lighting | Lux < 10 | 5 < Lux < 60 | 30 < Lux < 2500 | 1500 < Lux |
| Screen backlight brightness | 1.5-3% PWM | 3%-6.5% PWM (range based on 10%-100% brightness - user defined in Screen/Keyboard options screen) | ~10%-40% PWM (range based on 10%-100% brightness - user defined in Screen/Keyboard options screen) | ~100% PWM |

As indicated in Table A, in one example, the screen backlight is adjustable in multiple discrete steps (such as for example 5 or 10) between the end values in the VERY DIM mode screen backlight brightness range (e.g., 1.5-3% PWM), additional multiple discrete steps between the DIM mode screen backlight brightness range (e.g., 3% and 6.5% PWM), additional multiple discrete steps between the OFFICE mode screen backlight brightness range (e.g., 10% and 40% PWM), and may also be set to the BRIGHT mode screen backlight brightness value (e.g., 100% PWM). In one example, the screen backlight may also provide a smooth and quick fade (for example, within 200 ms) and a slow fade (for example, in 1-1.5 s) between any of these steps and the off state. In one example, the keypad backlight is adjustable in multiple (for example, at least 5) discrete steps between 0% and 100% PWM, allowing for a smooth and quick fade (for example, within 200 ms) and a very slow fade (for example, in 4-5 seconds) between each of these discrete steps and the off state.

Table A describes the display and keypad backlight brightness values as a range of possible values (for example, in one example VERY DIM mode has a possible PWM value somewhere between 1.5% and 3%). The exact PWM value is determined by selecting a value in that range (as an example, 2%) by calculating based on a User Brightness Value that is set by the user (as an example, a value between 1 and 100). When the user selects the minimum User Brightness Value (in this example it would be 1) the corresponding minimum PWM value in the range is selected (e.g., 1.5%). When the user selects the maximum User Brightness Value (in this example 100) the corresponding maximum PWM is selected (e.g., 30%). For a value in between the minimum and maximum User Brightness Value, a calculation is performed to determine the corresponding PWM value. For example: PWM=(MaxPWM−MinPWM)*((User Brightness Value)/(Max User Brightness Value−Min User Brightness Value))+MinPWM, where MaxPWM is the maximum PWM and MinPWM is the minimum PWM. This example calculation is a simple linear mapping of the User Brightness Value to the PWM value. However, other calculations may be used such as logarithmic mapping or a direct mapping of values using a table. The PWM values used in Table A are for reference only and in application may be adjusted on the basis of determining the correct backlight luminance levels ($cd/m^2$) which correlate to these PWM values. As opposed to PWM control a given system may control the backlight LED power by adjusting the current with an analogue DC current adjustment or a combination of PWM and analogue control.

In one example, when the User Brightness Value is changed, the new User Brightness Value may be used to adjust the current display and/or keypad brightness values. The new User Brightness Value may also be used to adjust all display and keypad brightness values as the display and keypad modes change.

The device may be set with a default User Brightness Value, which is used if the user does not set the User Brightness Value. This default value may be stored, for example, in the device ROM 148.

The flow charts of FIGS. 5-12, which will now be described, illustrate further examples. Some of the steps illustrated in the flow charts may be performed in an order other than that which is described. Also, it should be appreciated that not all of the steps described in the flow charts need be performed, that additional steps may be added, and that some of the illustrated steps may be substituted with other steps.

Figure 5:
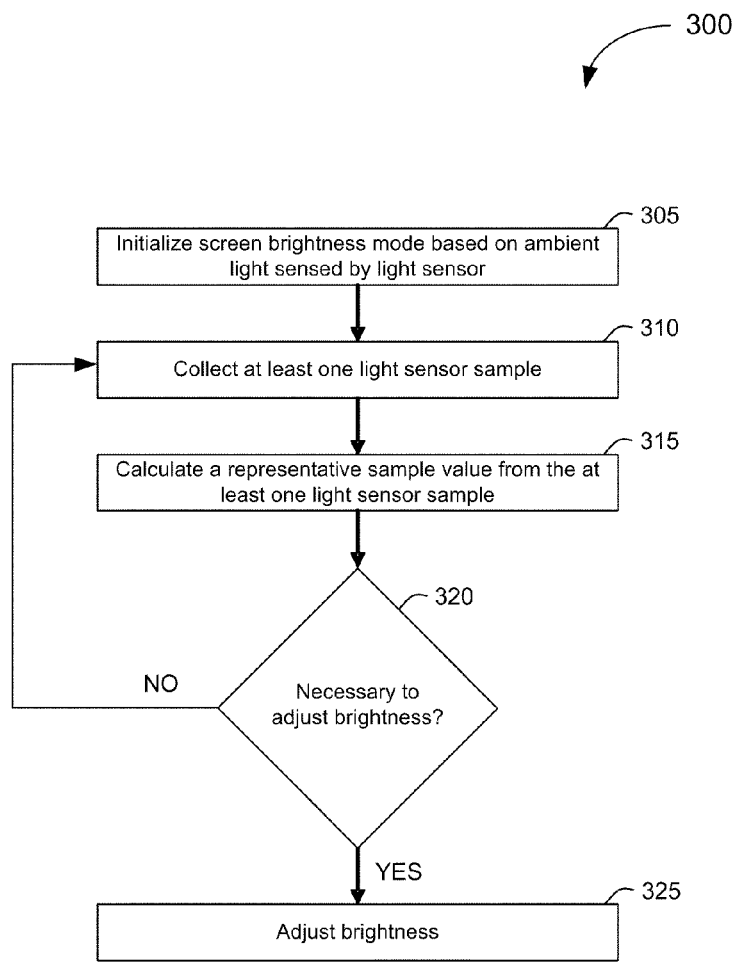
FIG. 5 shows in flowchart form a method for automatically adjusting screen brightness for an electronic device suitable for use with the wireless device of FIG. 1.

FIG. 5 is a flow chart illustrating a method 300 for automatically adjusting screen and/or keypad brightness, according to one example of the present application. At a block 305, when the wireless device 102 is turned on, the backlight mode is normally initialized to an appropriate mode using the ambient lighting sensed by the light sensor 161 at that time. Next at a block 310, at least one light sensor sample is taken, for example at set intervals, and maintained in a buffer (e.g., the event record 260) containing the single or multiple (e.g., five samples) most recent samples at any given time. This buffer is referred to as the sample window because it is a moving interval or window such that when each new sample is received, the oldest sample in the interval or window is discarded from the buffer. The amount of time between each light sensor sample determines the sampling rate. In one example, a sampling rate is one sample per 1.2 seconds, although in some situations the sampling rate may be increased (to, for example, 400 ms temporarily for 5 samples) to facilitate quick adjustment of the screen and/or keypad backlights. At a block 315, an ambient light representative sample value from the at least one light sensor sample is calculated. In one example, this can be done by sorting all samples in the sample window and choosing the median or middle value (e.g., the third sample in a window of 5 samples, where the samples are ordered in increasing or decreasing order). In another example, an average of the samples may be taken and that average becomes the ambient light representative sample value. In yet another example, one of the samples in the window is taken (e.g., the first or the last sample in the window or the single sample if only one sample is taken at 315) and that sample becomes the ambient light representative sample value.

After the representative sample value is calculated, at a block 320 the representative sample value is compared to at least one of various thresholds to determine if a brightness adjustment is necessary, according to the example thresholds listed in state Table B, described below. At a block 325, if it was determined at 320 that a brightness adjustment was appropriate, then the brightness is adjusted. If it was determined at 320 that no adjustment is needed, the method 300 may return to a previous block such as 310. It is also recognized that when particular applications are active (e.g., running in the foreground) on the wireless device 102, it may be desirable to adjust the brightness of the screen and keypad in response to that particular application that is active. Examples of such applications include multi-media applications such as camera, video, and music player applications. However, it may also be desirable for brightness adjustments to be performed in response to non-multi-media applications, for example e-mail, calendar, and text-messaging. Accordingly, a device may be configured by a user or pre-configured by the manufacturer so that when a predetermined application is active, screen or keypad brightness is adjusted or even turned-off. For example, a device may be configured so that when a multi-media application is active, the screen backlight will not be dimmer than the OFFICE mode brightness level. Applications may be able to override configured settings shown in TABLE B and specify certain display and/or keypad intensity values and/or disable individual modes not considered appropriate for that application. Table B addresses example screen brightness settings when a multi-media application is active on the device. Further, the keypad backlight may be turned off during these applications to remove distraction from the user and also to reduce power consumption. If the ambient lighting falls within the TABLE B definition of DIM or lower, the keypad backlight may be activated upon the first key press, and this key press may not be ignored (e.g., the application should respond to the key press as it normally would). The keypad backlight may be shut-off after a predetermined amount of time of inactivity on the keypad. Table C presents examples of desired keypad brightness settings that depend on whether a multi-media application is active on the device and the current lighting mode based on the ambient lighting of the environment of the device.

TABLE B

| representative sample light sensor (Lux value) | A current mode is VERY DIM | B current mode is DIM | C current mode is OFFICE | D current mode is BRIGHT |
|---|---|---|---|---|
| 10 Lux (example VERY DIM UPPER THRESHOLD) | If a multi-media application is not active on the device, Switch to DIM mode If a multi-media application is active on the device, switch to OFFICE mode | If a multi-media application is not active on the device, stay in DIM mode If a multi-media application is active on the device, switch to OFFICE mode | If a multi-media application is not active on the device, Switch to DIM mode If a multi-media application is active on the device, switch to OFFICE mode | If a multi-media application is not active on the device, Switch to DIM mode If a multi-media application is active on the device, switch to OFFICE mode |
| 5 Lux (example DIM LOWER THRESHOLD) | n/a | If a multi-media application is not active on the device, Switch to VERY DIM mode If a multi-media application is active on the device, switch to OFFICE mode | If a multi-media application is not active on the device, Switch to VERY DIM mode If a multi-media application is active on the device, switch to OFFICE mode | If a multi-media application is not active on the device, Switch to VERY DIM mode If a multi-media application is active on the device, switch to OFFICE mode |
| 60 Lux (example DIM UPPER THRESHOLD) | Switch to OFFICE mode | Switch to OFFICE mode | n/a | Switch to OFFICE mode |
| 30 Lux (example OFFICE LOWER THRESHOLD) | switch to DIM mode | n/a | switch to DIM mode | switch to DIM mode |
| 2500 Lux (ex. OFFICE UPPER THRESHOLD) | switch to BRIGHT mode | switch to BRIGHT mode | switch to BRIGHT mode | n/a |
| 1500 Lux (example BRIGHT LOWER THRESHOLD) | switch to OFFICE mode | switch to OFFICE mode | n/a | Switch to OFFICE mode |

TABLE C

|  | Device is in a very dim environment (e.g. ambient light is <10 Lux) | Device is in a dim environment (e.g. ambient light is <60 Lux) | Device is in an office environment (e.g. ambient light is 30 < Lux < 2500) | Device is in a bright environment (e.g. ambient light is 1500 < Lux) |
|---|---|---|---|---|
| Keypad brightness setting if multi-media application is not active on the device | KEYPAD-OFF; switch to KEYPAD-ON-DIM if a key is pressed; switch back to KEYPAD-OFF after a predetermined number of seconds of keypad inactivity | KEYPAD-OFF; switch to KEYPAD-ON if a key is pressed; switch back to KEYPAD-OFF after a predetermined number of seconds of keypad inactivity | KEYPAD-OFF | KEYPAD-OFF |
| Keypad brightness setting if multi-media application is active on the device | KEYPAD-ON-DIM | KEYPAD-ON | KEYPAD-OFF | KEYPAD-OFF |

Figure 6:
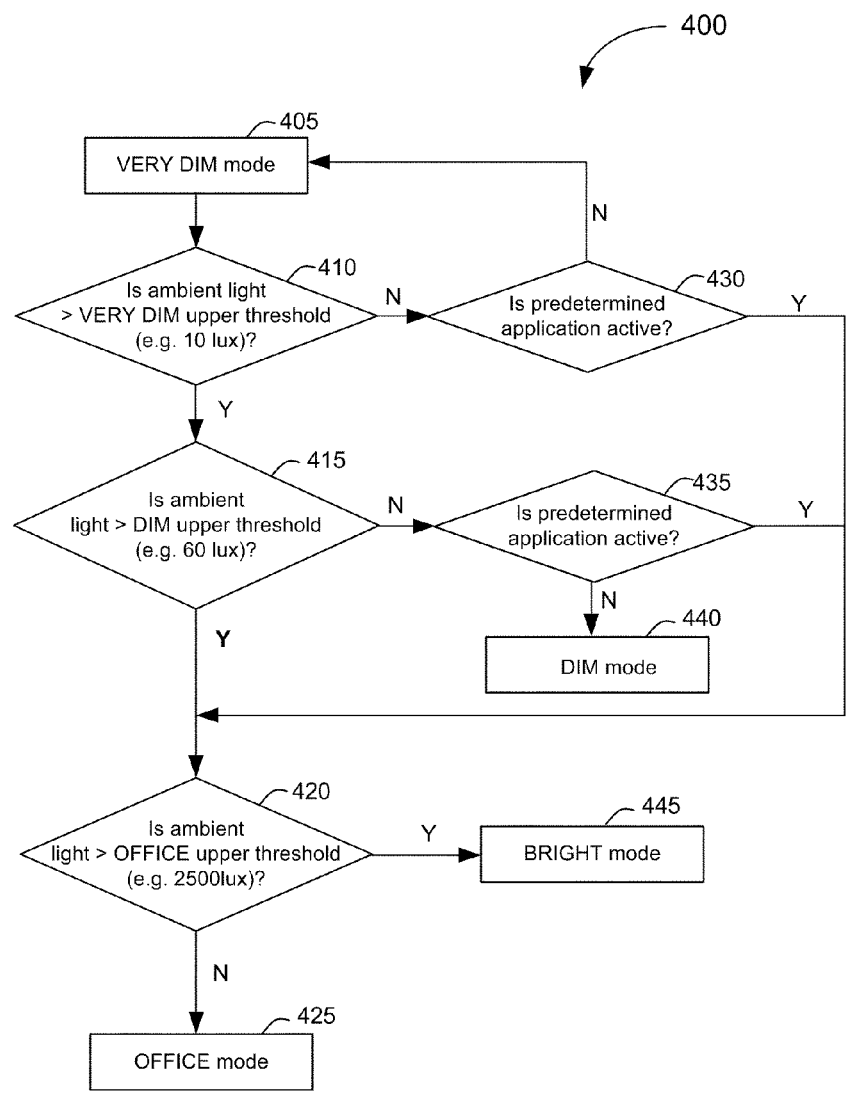
FIG. 6 shows in flowchart form a method for determining whether to adjust screen brightness, when the screen is currently in VERY DIM mode, suitable for use with the wireless device of FIG. 1.

FIG. 6 is a flowchart illustrating a method 400 which provides further details of block 320 of FIG. 5 (e.g., determining if it is appropriate to adjust brightness) for a screen of an electronic device, when the screen is currently in VERY DIM mode. FIG. 6 also illustrates the operation of the state Table B, column A.

At a block 405, the screen brightness mode is currently at VERY DIM mode, where the screen brightness setting is suitable for a very dim environment (for example, the VERY DIM mode screen backlight brightness setting described in TABLE A).

At a block 410, a determination is made whether the ambient light representative sample value is greater than the VERY DIM upper threshold (e.g., 10 lux). If the ambient light representative sample value is greater than the VERY DIM upper threshold, the method 400 proceeds to block 415. If the ambient light representative sample value is not greater than the VERY DIM upper threshold, the method 400 proceeds to block 430.

At block 430, a determination is made whether a predetermined application is active on the device. If the predetermined application is active on the device, the method proceeds to block 420. If the predetermined application is not active on the device, the method 400 proceeds to block 405, where the screen brightness mode remains at or is reset to VERY DIM mode.

At block 415, a determination is made whether the ambient light representative sample value is greater than the DIM upper threshold. If the ambient light representative sample value is greater than the DIM upper threshold, the method 400 proceeds to block 420. If the ambient light representative sample value is not greater than the DIM upper threshold not, the method proceeds to block 435.

At block 435, a determination is made whether a predetermined application is active on the device. If the predetermined application is active on the device, the method 400 proceeds to block 420. If the predetermined application is not active on the device, the method 400 proceeds to block 440, where the screen brightness mode is set to DIM mode.

At 420, a determination is made whether the ambient light representative sample value is greater than the OFFICE upper threshold. If the ambient light representative sample value is greater than the OFFICE upper threshold, the method 400 proceeds to block 445, where the screen brightness mode is set to BRIGHT mode, where the screen brightness setting is suitable for a bright environment (e.g., the BRIGHT mode screen backlight brightness setting described in TABLE A). If the ambient light representative sample value is not greater than the OFFICE upper threshold, the method 400 proceeds to block 425, where the screen brightness mode is set to OFFICE mode, where the screen brightness setting is suitable for an office environment (e.g., the OFFICE mode screen backlight brightness setting described in TABLE A).

Figure 7:
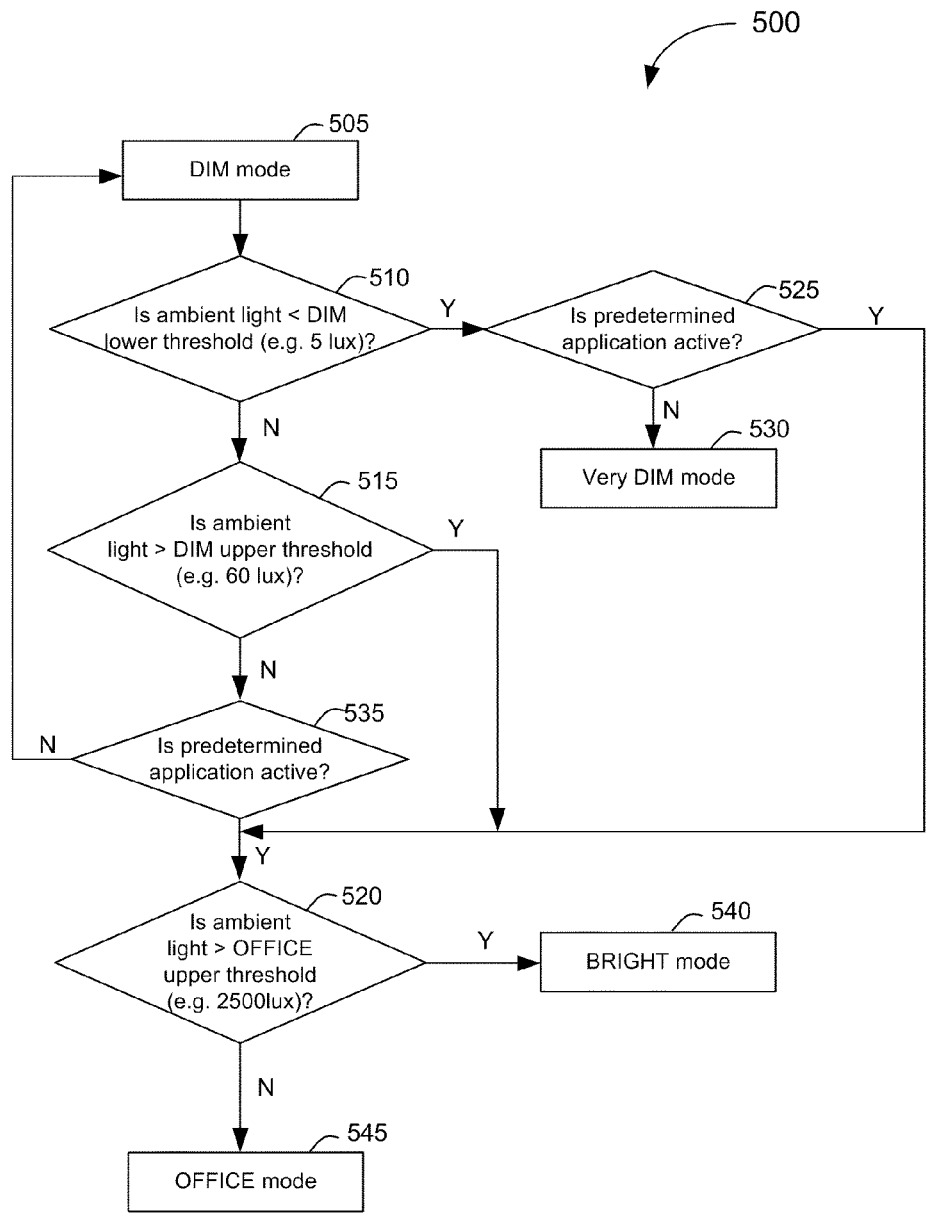
FIG. 7 shows in flowchart form a method for determining whether to adjust screen brightness, when the screen is currently in DIM mode, suitable for use with the wireless device of FIG. 1.

FIG. 7 is a flowchart illustrating a method 500 which provides further details of block 320 of FIG. 5 (e.g., determining if it is appropriate to adjust brightness) for a screen of an electronic device, when the screen is currently in DIM mode. FIG. 7 also illustrates the operation of the state Table B, column B.

At a block 505, the screen brightness mode is currently at DIM mode.

At a block 510, a determination is made whether the ambient light representative sample value is less than the DIM lower threshold. If the ambient light representative sample value is not less than the DIM lower threshold, the method 500 proceeds to a block 515. If the ambient light representative sample value is less than the DIM lower threshold, the method 500 proceeds to a block 525.

At block 525, a determination is made whether a predetermined application is active on the device. If the predetermined application is active on the device, the method 500 proceeds to block 520. If the predetermined application is not active on the device, the method 500 proceeds to block 530, where the screen brightness mode is set to VERY DIM mode.

At block 515, a determination is made whether the ambient light representative sample value is greater than the DIM upper threshold. If the ambient light representative sample value is not greater than the DIM upper threshold, the method 500 proceeds to block 535. If the ambient light representative sample value is greater than the DIM upper threshold, the method 500 proceeds to block 520.

At block 535, a determination is made whether a predetermined application is active on the device. If the predetermined application is active on the device, the method 500 proceeds to block 520. If the predetermined application is not active on the device, the method 500 proceeds to block 505, where the screen brightness mode remains at or is reset to DIM mode.

At block 520, a determination is made whether the ambient light representative sample value is greater than the OFFICE upper threshold. If the ambient light representative sample value is greater than the OFFICE upper threshold, the method 500 proceeds to block 540, where the screen brightness mode is set to BRIGHT mode. If the ambient light representative sample value is not greater than the OFFICE upper threshold, the method 500 proceeds to block 545, where the screen brightness mode is set to OFFICE mode.

Figure 8:
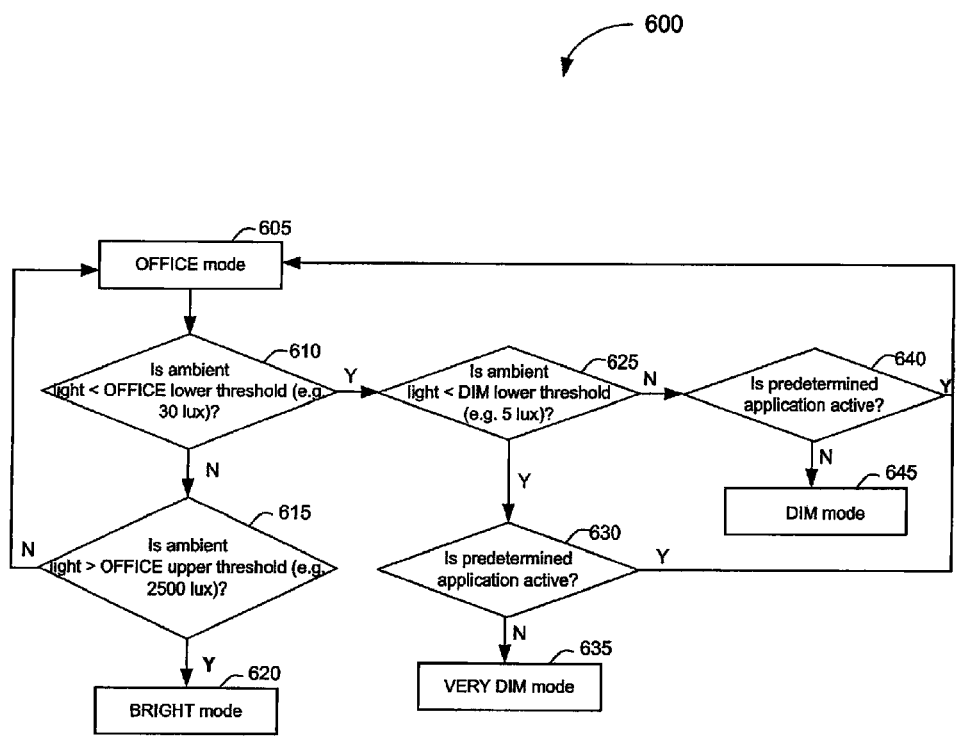
FIG. 8 shows in flowchart form a method for determining whether to adjust screen brightness, when the screen is currently in OFFICE mode, suitable for use with the wireless device of FIG. 1.

FIG. 8 is a flowchart illustrating a method 600 which provides further details of block 320 of FIG. 5 (e.g., determining if it is appropriate to adjust brightness) for a screen of an electronic device, when the screen is currently in OFFICE mode. FIG. 8 also illustrates the operation of the state Table B, column C.

At a block 605, the screen brightness mode is currently in OFFICE mode.

At a block 610, a determination is made whether the ambient light representative sample value is less than the OFFICE lower threshold. If the ambient light representative sample value is not less than the OFFICE lower threshold, the method 600 proceeds to a block 615. If the ambient light representative sample value is less than the OFFICE lower threshold, the method 600 proceeds to a block 625.

At block 615, a determination is made whether the ambient light representative sample value is greater than the OFFICE upper threshold. If the ambient light representative sample value is not greater than the OFFICE upper threshold, the method 600 proceeds to block 605, where the screen brightness mode remains at or is reset to OFFICE mode. If the ambient light representative sample value is greater than the OFFICE upper threshold, the method proceeds to a block 620, where the screen brightness mode is set to BRIGHT mode.

At block 625, a determination is made whether the ambient light representative sample value is less than the DIM lower threshold. If the ambient light representative sample value is not less than the DIM lower threshold, the method 600 proceeds to block 640. If the ambient light representative sample value is less than the DIM lower threshold, the method 600 proceeds to block 630.

At block 630, a determination is made whether a predetermined application is active on the device. If a predetermined application is active on the device, the method 600 proceeds to block 605, where the screen brightness mode remains at or is reset to OFFICE mode. If a predetermined application is not active on the device, the method 600 proceeds to a block 635, where the screen brightness mode is set to VERY DIM mode.

At block 640, a determination is made whether a predetermined application is active on the device. If a predetermined application is active on the device, the method 600 proceeds to block 605, where the screen brightness mode remains at or is reset to OFFICE mode. If a predetermined application is not active on the device, the method 600 proceeds to a block 645, where the screen brightness mode is set to DIM mode.

Figure 9:
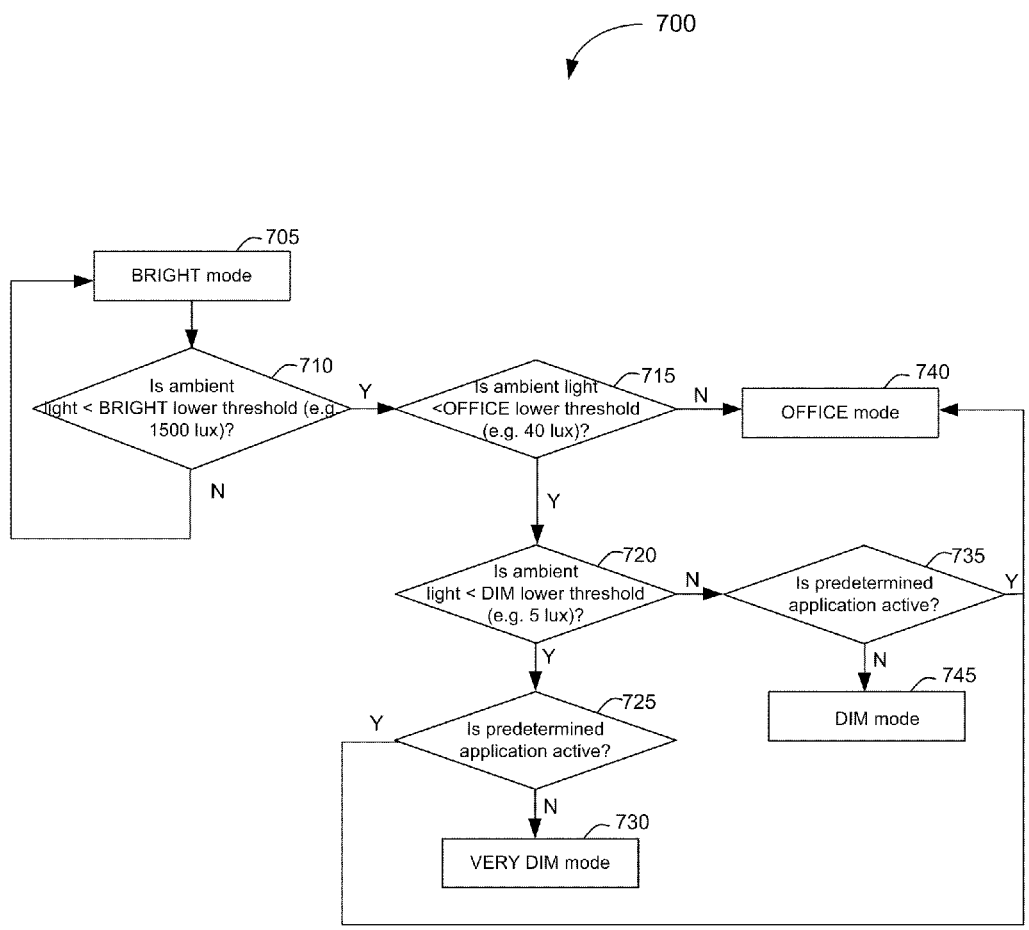
FIG. 9 shows in flowchart form a method for determining whether to adjust screen brightness, when the screen is currently in BRIGHT mode, suitable for use with the wireless device of FIG. 1.

FIG. 9 is a flowchart illustrating a method 700 which provides further details of block 320 of FIG. 5 (e.g., determining if it is necessary to adjust brightness) for a screen of an electronic device, when the screen is currently in BRIGHT mode. FIG. 9 also illustrates the operation of the state Table B, column D.

At a block 705, the screen brightness mode is currently in BRIGHT mode.

At a block 710, a determination is made whether the ambient light representative sample value is less than the BRIGHT lower threshold. If the ambient light representative sample value is not less than the BRIGHT lower threshold not, the method 700 returns to block 705, where the screen brightness mode remains at or is reset to BRIGHT mode. If the ambient light representative sample value is less than the BRIGHT lower threshold, the method 700 proceeds to a block 715.

At block 715, a determination is made whether the ambient light representative sample value is less than the OFFICE lower threshold. If the ambient light representative sample value is less than the OFFICE lower threshold, the method 700 proceeds to a block 720. If the ambient light representative sample value is not less than the OFFICE lower threshold not, the method 700 proceeds to a block 740.

At block 720, a determination is made whether the ambient light representative sample value is less than the DIM lower threshold. If the ambient light representative sample value is not less than the DIM lower threshold, the method 700 proceeds to a block 735. If the ambient light representative sample value is less than the DIM lower threshold, the method 700 proceeds to a block 725.

At block 725, a determination is made whether a predetermined application is active on the device. If a predetermined application is active on the device, the method 700 proceeds to block 740, where the screen brightness mode is set to OFFICE mode. If a predetermined application is not active on the device, the method 700 proceeds to block 730, where the screen brightness mode is set to VERY DIM mode.

At block 735, a determination is made whether a predetermined application is active on the device. If a predetermined application is active on the device, the method 700 proceeds to block 740, where the screen brightness mode is set to OFFICE mode. If a predetermined application is not active on the device, the method 700 proceeds to block 745, where the screen brightness mode is set to DIM mode.

As indicated above, in one example, keypad lighting is controlled independently of screen backlighting to allow the keypad to respond more quickly to dim environments, and to allow the screen to respond more quickly to office and bright or sunlight environments.

Figure 10:
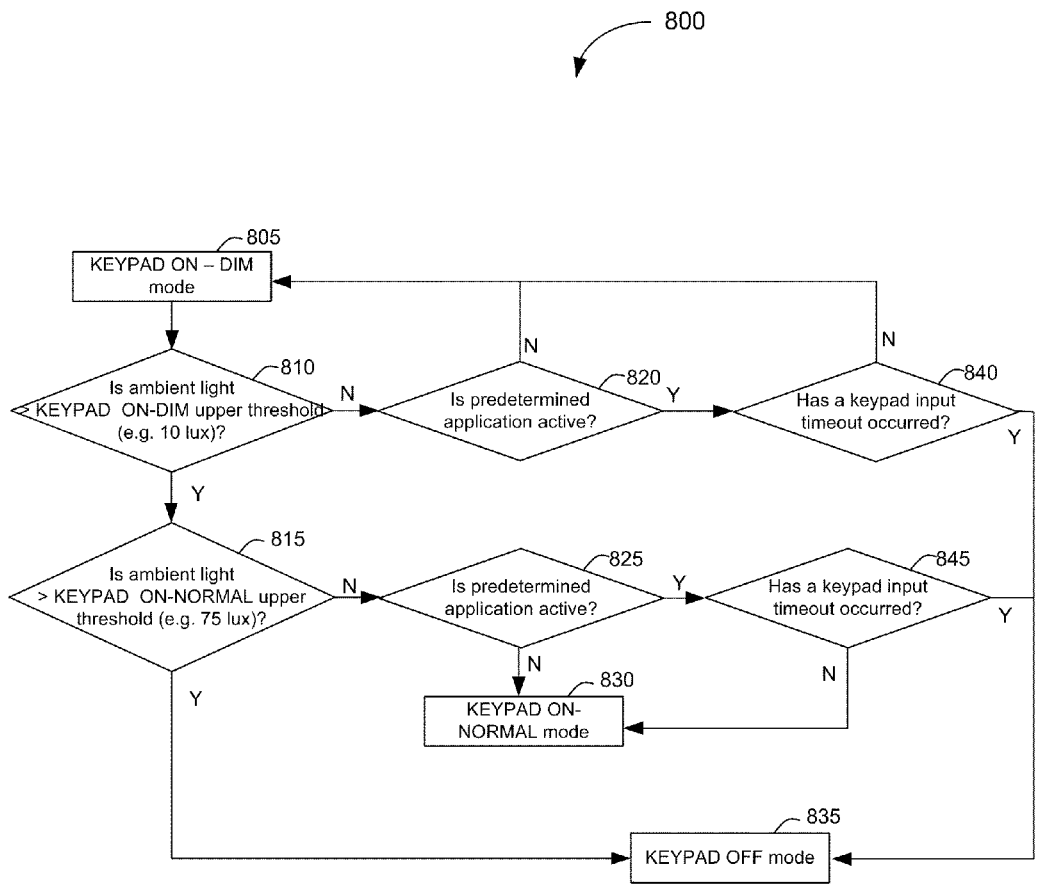
FIG. 10 shows in flowchart form a method for determining whether to adjust keypad brightness, when the keypad is currently dimmed, suitable for use with the wireless device of FIG. 1.

FIG. 10 is a flowchart illustrating a method 800 which provides further details of block 320 of FIG. 3 (e.g., determining if it is appropriate to adjust brightness) for a keypad of an electronic device, when the keypad is currently in KEYPAD ON-DIM mode. FIG. 10 also illustrates how the keypad brightness may be adjusted to the desired keypad brightness for the current environment of the device, per Table C.

At a block 805, the keypad is currently in KEYPAD ON-DIM mode.

At a block 810, a determination is made whether the ambient light representative sample value is greater than the KEYPAD ON-DIM upper threshold. If the ambient light representative sample value is greater than the KEYPAD ON-DIM upper threshold, the method 800 proceeds to block 815. If the ambient light representative sample value is not greater than the KEYPAD ON-DIM upper threshold not, the method 800 proceeds to block 820.

At block 815, a determination is made whether the ambient light representative sample value is greater than the KEYPAD ON-NORMAL upper threshold. If the ambient light representative sample value is greater than the KEYPAD ON-NORMAL upper threshold, the method 800 proceeds to a block 835, where the keypad brightness mode is set to KEYPAD OFF mode. If the ambient light representative sample value is not greater than the KEYPAD ON-NORMAL upper threshold, the method 800 proceeds to a block 825.

At block 820, a determination is made whether a predetermined application is active on the device. If a predetermined application is active on the device, the method 800 proceeds to a block 840 If a predetermined application is not active on the device, the method 800 proceeds to block 805, where the keypad brightness mode remains at or is reset to KEYPAD ON-DIM mode.

At block 840, it is determined if a keypad input timeout occurred. If a timeout occurred, the method 800 proceeds to a block 835, where the keypad brightness mode is set to KEYPAD OFF mode. If a timeout has not occurred, the method 800 proceeds to block 805, where the keypad brightness mode remains at or is reset to KEYPAD ON-DIM mode.

At block 825, a determination is made whether a predetermined application is active on the device. If a predetermined application is active on the device, the method 800 proceeds to a block 845. If a predetermined application is not active on the device, the method 800 proceeds to block 830, where the keypad brightness mode remains or is reset to KEYPAD ON-NORMAL mode.

At block 845, it is determined if a keypad input timeout occurred. If a timeout occurred, the method 800 proceeds to a block 835, where the keypad brightness mode is set to KEYPAD OFF mode. If a timeout has not occurred, the method 800 proceeds to block 830, where the keypad brightness mode remains or is reset to KEYPAD ON-NORMAL mode.

Figure 11:
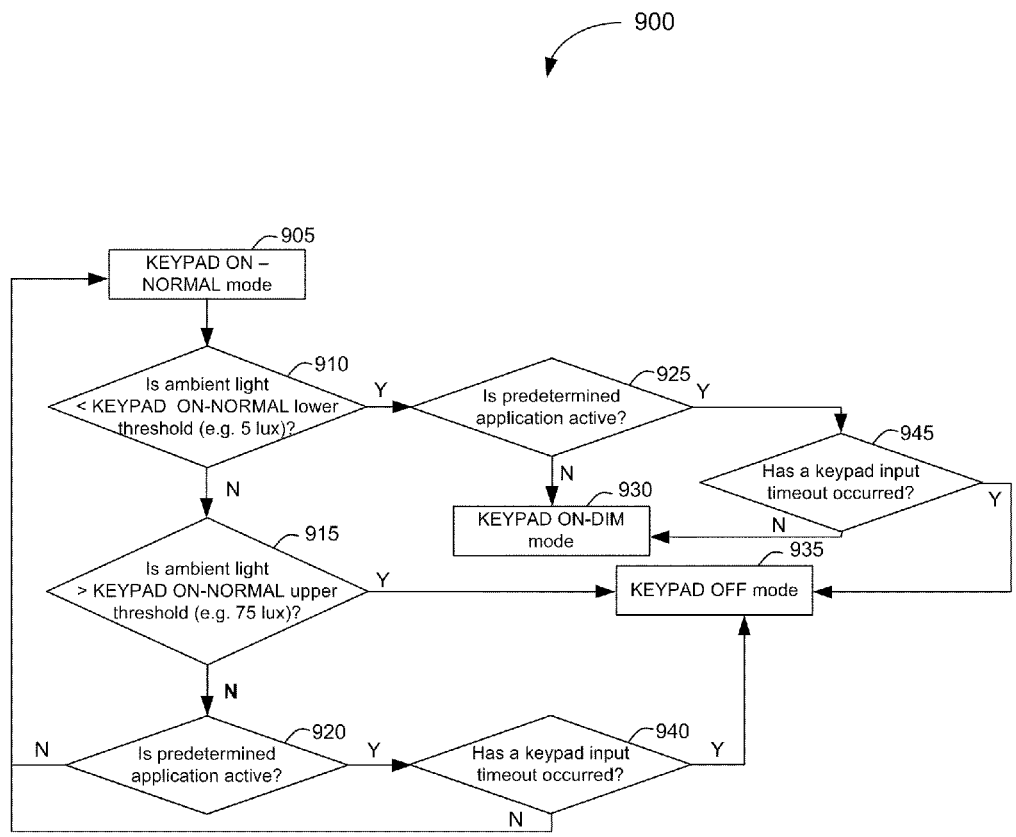
FIG. 11 shows in flowchart form a method for determining whether to adjust keypad brightness, when the keypad is currently on at normal brightness, suitable for use with the wireless device of FIG. 1.

FIG. 11 is a flowchart illustrating a method 900 which provides further details of block 320 of FIG. 3 (e.g., determining if it is appropriate to adjust brightness) for a keypad of an electronic device, when the keypad is currently in KEYPAD ON-NORMAL mode. FIG. 3 also illustrates how the keypad brightness may be adjusted to the desired keypad brightness for the current environment of the device, per Table C.

At a block 905, the keypad is currently in KEYPAD ON-NORMAL mode.

At a block 910, a determination is made whether the ambient light representative sample value is less than the KEYPAD ON-NORMAL lower threshold. If the ambient light representative sample value is less than the KEYPAD ON-NORMAL lower threshold, the method 900 proceeds to a block 925. If the ambient light representative sample value is not less than the KEYPAD ON-NORMAL lower threshold, the method 900 proceeds to block 915.

At block 915, a determination is made whether the ambient light representative sample value is greater than the KEYPAD ON-NORMAL upper threshold. If the ambient light representative sample value is greater than the KEYPAD ON-NORMAL upper threshold, the method 900 proceeds to block 935, where the keypad brightness mode is set to KEYPAD OFF mode. If the ambient light representative sample value is not greater than the KEYPAD ON-NORMAL upper threshold, the method 900 proceeds to block 920.

At block 920, a determination is made whether a predetermined application is active on the device. If a predetermined application is active on the device, the method 900 proceeds to a block 940. If a predetermined application is not active on the device, the method 900 proceeds to block 905, where the keypad brightness mode remains at or is reset to KEYPAD ON-NORMAL mode.

At block 940, it is determined if a keypad input timeout occurred. If a timeout occurred, the method 900 proceeds to a block 935, where the keypad brightness mode is set to KEYPAD OFF mode. If a timeout has not occurred, the method 900 proceeds to block 905, where the keypad brightness mode remains at or is reset to KEYPAD ON-NORMAL mode.

At block 925, a determination is made whether a predetermined application is active on the device. If a predetermined application is active on the device, the method 900 proceeds to a block 945. If a predetermined application is not active on the device, the method 900 proceeds to block 930, where the keypad brightness mode is set to KEYPAD ON-DIM mode.

At block 945, it is determined if a keypad input timeout occurred. If a timeout occurred, the method 900 proceeds to block 935, where the keypad brightness mode is set to KEYPAD OFF mode. If a timeout has not occurred, the method 900 proceeds to block 930, where the keypad brightness mode remains or is reset to KEYPAD ON-DIM mode.

Figure 12:
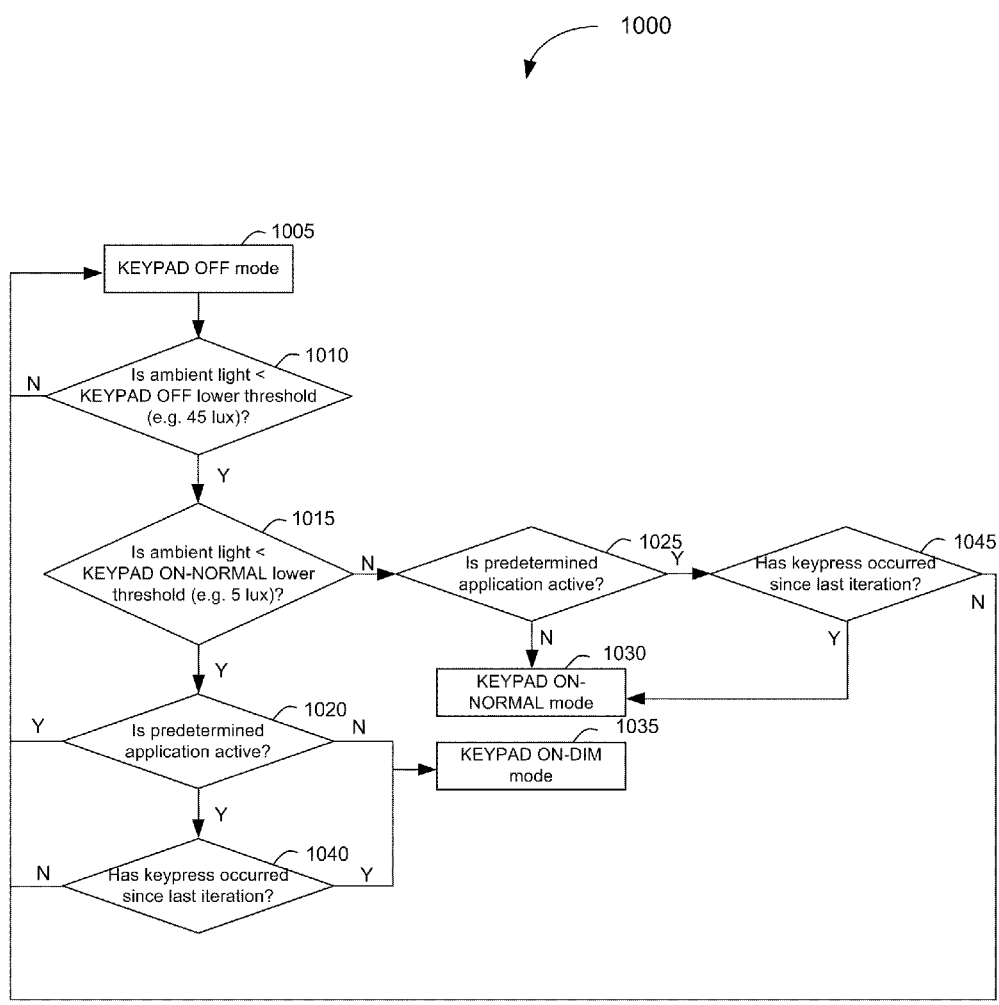
FIG. 12 shows in flowchart form a method for determining whether to adjust keypad brightness, when the keypad is currently off, suitable for use with the wireless device of FIG. 1.

FIG. 12 is a flowchart illustrating a method 1000 which provides further details of block 320 of FIG. 3 (e.g., determining if it is appropriate to adjust brightness) for a keyboard of an electronic device, when the keypad is currently in KEYPAD OFF mode. FIG. 3 also illustrates how the keypad brightness may be adjusted to the desired keypad brightness for the current environment of the device, per Table C.

At a block 1005, the keypad is currently in KEYPAD OFF mode.

At a block 1010, a determination is made whether the ambient light representative sample value is less than the KEYPAD OFF lower threshold. If the ambient light representative sample value is less than the KEYPAD OFF lower threshold, the method 1000 proceeds to a block 1015. If the ambient light representative sample value is not less than the KEYPAD OFF lower threshold, the method 1000 proceeds to block 1005, where the keypad brightness mode remains at or is reset to KEYPAD OFF mode.

At block 1015, a determination is made whether the ambient light representative sample value is less than the KEYPAD ON-NORMAL lower threshold. If the ambient light representative sample value is less than the KEYPAD ON-NORMAL lower threshold, the method 1000 proceeds to a block 1020. If the ambient light representative sample value is not less than the KEYPAD ON-NORMAL lower threshold, the method 1000 proceeds to a block 1025.

At block 1020, a determination is made whether a predetermined application is active on the device. If a predetermined application is not active on the device, the method 1000 proceeds to a block 1035, where the keypad brightness mode is set to KEYPAD ON-DIM mode. If a predetermined application is active on the device, the method 1000 proceeds to a block 1040.

At block 1040, it is determined if a keypad input occurred. If a keypad input occurred, the method 1000 proceeds to block 1035, where the keypad brightness mode is set to KEYPAD ON-DIM mode. If a keypad input has not occurred, the method 1000 proceeds to block 1005, where the keypad brightness mode remains at or is reset to KEYPAD OFF mode.

At block 1025, a determination is made whether a predetermined application is active on the device. If a predetermined application is not active on the device, the method 1000 proceeds to block 1030, where the keypad brightness mode is set to KEYPAD ON-NORMAL mode. If a predetermined application is active on the device, the method 1000 proceeds to a block 1045.

At block 1045, it is determined if a keypad input occurred. If a keypad input occurred, the method 1000 proceeds to block 1030, where the keypad brightness mode is set to KEYPAD ON-NORMAL mode. If a keypad input has not occurred, the method 1000 proceeds to block 1005, where the keypad brightness mode remains or is reset to KEYPAD OFF mode.

Regarding the foregoing description, it will be noted that the threshold for changing from DIM mode to OFFICE mode is higher than the threshold for changing from OFFICE to DIM mode. This compensates for situations where the ambient lighting is hovering around a particular threshold value and prevents constant transitions between backlight states. A similar hysteresis may be integrated into the threshold values between other adjacent display and keypad modes.

The light sensor functionality set forth herein may be altered or disabled by the user via an "Automatic Backlight" option accessible through a Screen/Keyboard options screen displayed by device.

In one example, Automatic Backlight may be disabled. This gives the user the following manual control over backlighting. The user may press a pre-defined key to select among three possible display brightnesses: 1) OFFICE 2) BRIGHT and 3) backlight/screen off. When the screen is on, the keypad backlight is set to KEYPAD ON-NORMAL. When the screen is off, the keypad backlight is always off.

In another example, Automatic Backlight is disabled with no option for the user to manually control the backlighting. In one example embodiment, this option is labeled as "Automatic Backlight Dimming: Off". When this option is enabled, the display may only switch between OFFICE and BRIGHT mode (e.g., OFFICE mode is used in ambient lighting environments normally corresponding to DIM or VERY DIM). Additionally, the keypad will only switch between KEYPAD OFF and KEYPAD ON-NORMAL (e.g., KEYPAD ON-NORMAL is used in ambient lighting conditions normally corresponding to KEYPAD ON-DIM). It is noted that this functionality is similar to the application-specific functionality described in paragraph [0022]. However, in this example, the keypad may turn on. Also, this example may be global to all applications if it is selected by the user.

While the examples described herein are directed to particular implementations of the method for automatically adjusting screen and keypad brightness on a mobile electronic device, it will be understood that modifications and variations to these examples are within the scope and sphere of the present application. For example, as indicated above the backlighting brightness adjustment methodology set forth herein is not limit in its application to electronic devices but may advantageously applied to other electronic devices such as desktop computers, cellular telephones, GPS receivers, smart telephones, and laptop computers. Furthermore, the screen display may be any light-emitting display, such as a liquid crystal display, light-emitting diode display, liquid crystal on silicon display, active matrix organic light emitting diode display, or surface-conduction electron-emitter display. Also, it is contemplated that the keypad backlighting adjustment techniques apply to other keypad-like devices such as buttons, trackballs or touchpads. Furthermore, it is contemplated that the display modes (VERY DIM, DIM, OFFICE, BRIGHT) and keypad modes (KEYPAD ON-DIM, KEYPAD ON-NORMAL, KEYPAD OFF) may be further subdivided into more modes, each with their own ambient lighting thresholds and corresponding backlight brightness values. Also contemplated is the possibility of using the described system on a device that has more than one display and/or more than one keypad. Many other modifications and variations may occur to those skilled in the art. All such modifications and variations are believed to be within the sphere and scope of the present application.

What is claimed is:

1. A method for use in a mobile electronic device for adjusting brightness of a display on the mobile electronic device, the method comprising:
    collecting a plurality of light sensor samples using an ambient light sensor of the mobile electronic device;
    calculating a representative value of the plurality of light sensor samples;
    comparing the representative value to at least one brightness threshold value;
    determining if a predetermined application is active on the mobile electronic device;
    adjusting the brightness of the display based on the comparison and based on whether it is determined that the predetermined application is active on the mobile electronic device by:
        when it is determined that the predetermined application is not active on the mobile electronic device, adjusting the brightness of the display to one of a plurality of lighting modes corresponding to an ambient environment indicated by the comparison, each one of the plurality of lighting modes specified for use in a different ambient environment; and
        when it is determined that the predetermined application is active on the mobile electronic device, overriding any adjustment based on the comparison and adjusting the brightness of the display to a lighting mode that is specified for use in each of the different ambient environments whenever the predetermined application is active on the mobile electronic device.

2. The method of claim 1, wherein the predetermined application is a multi-media application.

3. The method of claim 1, wherein the display of which the brightness is adjusted is at least one of a light-emitting screen display and a keypad backlight.

4. The method of claim 1, wherein collecting the plurality of light sensor samples further comprises collecting the plurality of light sensor samples for a moving interval of time.

5. The method of claim 1, wherein calculating the representative value comprises sorting the plurality of light sensor samples and selecting the median value as the representative value.

6. The method of claim 1, wherein calculating the representative value comprises taking an average of the plurality of light sensor samples and making the average the representative value.

7. A wireless device comprising:
    a processor for controlling operation of the wireless device;
    an ambient light sensor providing a signal to the processor indicating an ambient light intensity surrounding the wireless device;
    a keypad device coupled to the processor for accepting an input;
    at least one display device coupled to the processor for communicating an output to the user;
    a communications subsystem coupled to the processor for communicating with a communications network;
    a memory coupled to the processor; and
    a storage device coupled to the processor;
    the wireless device comprising a brightness adjustment module resident in the memory for execution by the processor, the brightness adjustment module configured to:
        collect a plurality of light sensor samples using the ambient light sensor;
        calculate a representative value of the plurality of light sensor samples;

compare the representative value to at least one brightness threshold value;
determine if a predetermined application is active on the wireless device;
adjust the brightness of at least one of the display device and the keypad device based on the comparison and based on whether it is determined that the predetermined application is active on the wireless device:
when it is determined that the predetermined application is not active on the wireless device, adjust the brightness of at least one of the display device and the keypad device to one of a plurality of lighting modes corresponding to an ambient environment indicated by the comparison, each one of the plurality of lighting modes specified for use in a different ambient environment; and
when it is determined that the predetermined application is active on the wireless device, override any adjustment based on the comparison and adjust the brightness of at least one of the display device and the keypad device to a lighting mode that is specified for use in each of the different ambient environments whenever the predetermined application is active on the wireless device.

8. The wireless device of claim 7, wherein the predetermined application is a multimedia application.

9. The wireless device of claim 7, wherein collecting the plurality of light sensor samples comprises collecting the plurality of light sensor samples for a moving interval of time.

10. The wireless device of claim 7, wherein calculating the representative value comprises sorting the plurality of light sensor samples and selecting the median value as the representative value.

11. The wireless device of claim 7, wherein calculating the representative value comprises taking an average of the plurality of light sensor samples and making the average the representative value.

* * * * *